US012626915B2

(12) United States Patent
Huang et al.

(10) Patent No.: US 12,626,915 B2
(45) Date of Patent: May 12, 2026

(54) SODIUM-ION BATTERY, POSITIVE ELECTRODE PLATE FOR SODIUM-ION BATTERY, POSITIVE ACTIVE MATERIAL, BATTERY MODULE, BATTERY PACK, AND DEVICE

(71) Applicant: CONTEMPORARY AMPEREX TECHNOLOGY (HONG KONG) LIMITED, Hong Kong (CN)

(72) Inventors: Liting Huang, Ningde (CN); Yongsheng Guo, Ningde (CN); Chengdu Liang, Ningde (CN); Jiadian Lan, Ningde (CN); Wenguang Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 675 days.

(21) Appl. No.: 17/558,646

(22) Filed: Dec. 22, 2021

(65) Prior Publication Data

US 2022/0115653 A1 Apr. 14, 2022

Related U.S. Application Data

(63) Continuation of application No. PCT/CN2020/120314, filed on Oct. 12, 2020.

(30) Foreign Application Priority Data

Oct. 18, 2019 (CN) .......................... 201910995176.8

(51) Int. Cl.
*H01M 10/054* (2010.01)
*H01M 4/131* (2010.01)
(Continued)

(52) U.S. Cl.
CPC ........... *H01M 4/485* (2013.01); *H01M 4/131* (2013.01); *H01M 4/381* (2013.01); *H01M 4/505* (2013.01);
(Continued)

(58) Field of Classification Search
CPC ............. H01M 10/054; H01M 10/052; H01M 10/0525; H01M 4/525; H01M 4/131;
(Continued)

(56) References Cited

U.S. PATENT DOCUMENTS

2002/0012843 A1* 1/2002 Munakata ............. H01M 4/485
429/231.95
2007/0218361 A1* 9/2007 Inoue ................... H01M 4/1391
429/223
(Continued)

FOREIGN PATENT DOCUMENTS

CN 103840149 A 6/2014
CN 104795550 A 7/2018
(Continued)

OTHER PUBLICATIONS

Communication pursuant to Rule 114(2) EPC for EP application No. 20877427.3, mailed Jan. 18, 2023.
(Continued)

*Primary Examiner* — Jeremiah R Smith
(74) *Attorney, Agent, or Firm* — K&L Gates LLP

(57) ABSTRACT

This application relates to a sodium-ion battery, a positive electrode plate for a sodium-ion battery, a battery module, a battery pack, and a device. The sodium-ion battery according to this application includes a positive electrode plate, a negative electrode plate, a separator, and an electrolytic solution. The positive electrode plate includes a positive active material. A molecular formula of the positive active material satisfies $Na_aLi_bM_{0.7}Fe_{0.3-b}O_{2\pm\delta}$, M is a transition (Continued)

metal ion, $0.67<a<1.1$, $0<b<0.3$, $0\leq\delta\leq0.1$, and a ratio of $R_{ct}$ to $R_f$ of the positive active material satisfies $1.0<R_{ct}/R_f<20.0$. $R_{ct}$ is a charge transfer resistance of the positive active material measured in a button battery based on alternating current impedance spectroscopy, and $R_f$ is a diffusion resistance of the positive active material measured in the button battery based on the alternating current impedance spectroscopy.

15 Claims, 5 Drawing Sheets

(51) Int. Cl.

| | |
|---|---|
| *H01M 4/38* | (2006.01) |
| *H01M 4/485* | (2010.01) |
| *H01M 4/505* | (2010.01) |
| *H01M 4/525* | (2010.01) |
| *H01M 4/587* | (2010.01) |
| *H01M 4/02* | (2006.01) |

(52) U.S. Cl.
CPC ........... *H01M 4/525* (2013.01); *H01M 4/587* (2013.01); *H01M 10/054* (2013.01); *H01M 2004/021* (2013.01); *H01M 2004/027* (2013.01); *H01M 2004/028* (2013.01); *H01M 2220/20* (2013.01)

(58) Field of Classification Search
CPC ...... H01M 4/485; H01M 4/505; H01M 4/381; H01M 4/382; H01M 2004/021
See application file for complete search history.

(56) References Cited

U.S. PATENT DOCUMENTS

| | | | |
|---|---|---|---|
| 2011/0240913 A1* | 10/2011 | Kim ........................ | C01G 53/50 252/182.1 |
| 2016/0093913 A1* | 3/2016 | Saito ........................ | H01M 4/13 429/246 |
| 2016/0164093 A1* | 6/2016 | Inoue .................... | H01M 4/505 429/223 |
| 2017/0104204 A1* | 4/2017 | Zhamu ................. | H01M 10/054 |
| 2018/0026317 A1 | 1/2018 | Johnson et al. | |
| 2020/0112025 A1* | 4/2020 | Yamauchi ............. | H01M 4/136 |
| 2022/0029242 A1* | 1/2022 | Hippauf ............ | H01M 10/0525 |
| 2022/0123299 A1 | 4/2022 | Huang et al. | |
| 2023/0148440 A9* | 5/2023 | Harada ................. | H01M 4/134 429/209 |

FOREIGN PATENT DOCUMENTS

| | | |
|---|---|---|
| CN | 109860587 A | 6/2019 |
| CN | 112670497 A | 4/2021 |
| EP | 3972016 A1 | 3/2022 |

OTHER PUBLICATIONS

Basics of Electrochemical Impedance Spectroscopy, Application Note, Gamry Instruments, Inc. Dec. 6, 2010.

Pauwels et al. "Contribution to the impedance data analysis of mass-transfer controlled electrochemical systems", New Trends in Electrochemical Impedance Spectroscopy and Electrochemical Noise Analysis, pp. 23-29, Oct. 27, 2000.

Gathright et al. "Phase field model of electrochemical impedance spectroscopy", ECS Transactions, 35(1) 1077-1085, Sep. 22, 2011.

Yunming Li et al, Advanced sodium-ion batteries using superior low cost pyrolyzed anthracite anode: towards practical applications, Energy Storage Materials, 5 (2016) 191-197, 7 pages.

First Office Action of CN application No. 201910995176.8, dated Jun. 22, 2023.

Extended European Search Report of EP Application No. 20877427.3, mailed Sep. 29, 2022, 9 pages.

Wang Ji Eun et al, "New insight into Na intercalation with Li substitution on alkali site and high performance of 03-type ayered cathode material for sodium ion batteries", Journal of Materials Chemistry A, vol. 6, No. 45, Nov. 20, 2018, pp. 22731-22740, XP055963302.

You Ya et al., "Insights into the Improved High-Voltage Performance of Li-Incorporated Layered Oxide Cathodes for Sodium-Ion Batteries", Chem, vol. 4, No. 9, Sep. 13, 2018, pp. 2124-2139, XP055849958.

International Search Report for International Application PCT/CN2020/120314 mailed Jan. 12, 2021.

Written Opinion for International Application PCT/CN2020/120314 mailed Jan. 12, 2021.

Lufeng Yang et al. "Lithium-Doping Stabilized High-Performance P2-Na0.66Li0.18Fe0.12Mn0.702 Cathode for Sodium Ion Batteries" Journal of the American Chemical Society, vol. 141, No. 16, Apr. 1, 2019, pp. 6680-6689.

Notice of Reexamination, CN application No. 201910995176.8, dated Dec. 23, 2024.

Zehua Chen et al. "Study on the preparation of lithium manganate and lithium iron phosphate cathode materials for lithium ion secondary batteries", p. 130.

\* cited by examiner

5

5

SODIUM-ION BATTERY, POSITIVE ELECTRODE PLATE FOR SODIUM-ION BATTERY, POSITIVE ACTIVE MATERIAL, BATTERY MODULE, BATTERY PACK, AND DEVICE

CROSS-REFERENCE TO RELATED APPLICATIONS

This application is a continuation of International Patent Application No. PCT/CN2020/120314 filed on Oct. 12, 2020, which claims priority to Chinese Patent Application No. 201910995176.8, filed on Oct. 18, 2019. The aforementioned patent applications are incorporated herein by reference in their entirety.

TECHNICAL FIELD

This application relates to the field of batteries, and in particular, to a sodium-ion battery, a positive electrode plate for a sodium-ion battery, a battery module, a battery pack, and a device.

BACKGROUND

Currently, the lithium-ion battery technology is in a dominant position in the market of mainstream consumer batteries and power batteries. In the nearly three decades since its commercialization, the lithium-ion battery technology has matured gradually. Although bringing more and more convenience to mankind, lithium-ion batteries are facing great challenges. Lithium resources are increasingly scarce, the price of upstream materials keeps rising, the development of a recycling technology is lagging, and the recycling rate of old batteries is low. All such factors give rise to increasing market demand for a more economical and more efficient alternative technology. Sodium and lithium have similar physical and chemical properties. However, sodium is much more abundant in resource reserve than lithium, much more cost-efficient than lithium, and more widespread than lithium. As a new generation of electrochemical system that possibly replaces the existing energy storage technology, sodium-ion rechargeable batteries have attracted great attention from the scientific research circle and the industry circle in recent years.

In the 1970s, researchers began to pay attention to the sodium-ion rechargeable battery technology, However, due to successful commercialization of lithium-ion batteries, the development of sodium batteries has been suspended for a long time. Since 2010, the lithium-ion battery technology has encountered challenges in terms of a high energy density requirement, cost-efficiency, performance, and safety, and the sodium-ion rechargeable battery technology has once again stepped into the spotlight of research in the battery field. In the aspects ranging from the research on positive and negative electrode materials as well as the development of an electrolytic solution and a separator to the design of a new chemical or electrochemical system, the sodium-ion rechargeable battery technology is evolving explosively. Similar to the case of a lithium-ion battery, the performance of a sodium-ion battery is primarily bottlenecked by a positive electrode material. Therefore, the development of a high-performance positive electrode material is critical to the application of the sodium ion battery.

SUMMARY

In view of the problems in the background technologies, an objective of this application is to provide a positive active material for a sodium-ion battery, a positive electrode plate containing the positive active material according to this application, a sodium-ion battery containing the positive electrode plate according to this application, a battery module, a battery pack, and a device. A ratio of $R_{ct}$ to $R_f$ of the positive active material satisfies $1.0 < R_{ct}/R_f < 20.0$, where $R_{ct}$ is a charge transfer resistance, and $R_f$ is a diffusion resistance. This ratio value can effectively improve sodium deintercalation performance of the positive electrode plate and effectively improve electrochemical performance of the sodium-ion battery.

To fulfil the foregoing objective, according to a first aspect of this application, this application provides a sodium-ion battery, including a positive electrode plate, a negative electrode plate, a separator, and an electrolytic solution. The positive electrode plate includes a positive active material. A molecular formula of the positive active material satisfies $Na_aLi_bM_{0.7}Fe_{0.3-b}O_{2\pm\delta}$, M is a transition metal ion, $0.67 < a < 1.1$, $0 < b < 0.3$, $0 \le \delta \le 0.1$, and a ratio of $R_{ct}$ to $R_f$ of the positive active material satisfies $1.0 < R_{ct}/R_f < 20.0$.

$R_{ct}$ is a charge transfer resistance of the positive active material measured in a button battery based on alternating current impedance spectroscopy.

$R_f$ is a diffusion resistance of the positive active material measured in the button battery based on the alternating current impedance spectroscopy.

According to a second aspect of this application, this application provides a positive electrode plate for a sodium-ion battery. The positive electrode plate includes a positive active material layer carried on at least one surface of a positive current collector. The positive active material layer includes a positive active material. A molecular formula of the positive active material satisfies $Na_aLi_bM_{0.7}Fe_{0.3-b}O_{2\pm\delta}$, M is a transition metal ion, $0.67 < a < 1.1$, $0 < b < 0.3$, $0 < \delta < 0.1$, and a ratio of $R_{ct}$ to $R_f$ of the positive active material satisfies $1.0 < R_{ct}/R_f < 20.0$.

$R_{ct}$ is a charge transfer resistance of the positive active material measured in a button battery based on alternating current impedance spectroscopy.

$R_f$ is a diffusion resistance of the positive active material measured in the button battery based on the alternating current impedance spectroscopy.

According to a third aspect of this application, this application provides a positive active material for a sodium-ion battery. A molecular formula of the positive active material satisfies $Na_aLi_bM_{0.7}Fe_{0.3-b}O_{2\pm\delta}$, M is a transition metal ion, $0.67 < a < 1.1$, $0 < b < 0.3$, $0 \le \delta \le 0.1$, and a ratio of $R_{ct}$ to $R_f$ of the positive active material satisfies $1.0 < R_{ct}/R_f < 20.0$.

$R_{ct}$ is a charge transfer resistance of the positive active material measured in a button battery based on alternating current impedance spectroscopy.

$R_f$ is a diffusion resistance of the positive active material measured in the button battery based on the alternating current impedance spectroscopy.

According to a fourth aspect of this application, this application provides a battery module, including the sodium-ion battery according to the first aspect of this application.

According to a fifth aspect of this application, this application provides a battery pack, including the battery module according to the fourth aspect of this application.

According to a sixth aspect of this application, this application provides a device that uses a sodium-ion battery as a power supply. The device includes the sodium-ion battery according to the first aspect of this application or the battery pack according to the fifth aspect of this application.

Beneficial effects of this application are as follows:

In the sodium-ion battery according to this application, the positive active material is a layered-structured transition metal oxide. The layered-structured transition metal oxide is doped with low-valence inactive transition metal Li to improve cycle stability of the positive active material. In the positive active material according to this application, $Li^+$ ions are added as an inactive dopant into the transition metal oxide, rather than existent in the form of intercalation and deintercalation. During charge and discharge, effective ingredients in an electrolytic solution preemptively interact with the $Li^+$ ions to form a stable cathode-electrolyte interface (CEI) film to suppress dissolution of other transition metal ions in the transition metal oxide, so as to improve the cycle performance of the positive active material. In order not to reduce a capacity of the positive active material, a doping amount of lithium ions in the positive active material in this application is controlled to be not greater than 0.3.

In addition, the content of each metal ion in the positive active material is controlled so that the ratio of $R_{ct}$ to $R_f$ of the positive active material is controlled to be within the range of $1.0 < R_{ct}/R_f < 20.0$. This facilitates intercalation and deintercalation of sodium ions in the positive active material, and facilitates receiving of the transition metal ions and release of electrons, so as to fully exert electrical performance of the positive active material.

In this application, electrochemical performance of the positive active material is explored by using a button battery. Experimental data shows that, under a voltage of 2~4.2 V, the positive active material achieves excellent cycle performance, a high specific charge capacity, and a high specific discharge capacity. Therefore, the layered-structured transition metal oxide used as the positive active material according to this application embraces a broad application prospect in terms of sodium-ion batteries.

The battery module, the battery pack, and the device according to this application include the sodium-ion battery, and therefore, have at least the same advantages as the sodium-ion battery.

Understandably, the above general description and the following detailed description are merely exemplary without limiting this application.

BRIEF DESCRIPTION OF DRAWINGS

To describe the technical solutions in the embodiments of this application more clearly, the following outlines the accompanying drawings to be used in the description of the embodiments of this application. Apparently, the accompanying drawings outlined below are merely some embodiments of this application, and a person of ordinary skill in the art may derive other drawings from these accompanying drawings without making any creative efforts.

DETAILED DESCRIPTION OF EMBODIMENTS

Figure 1:
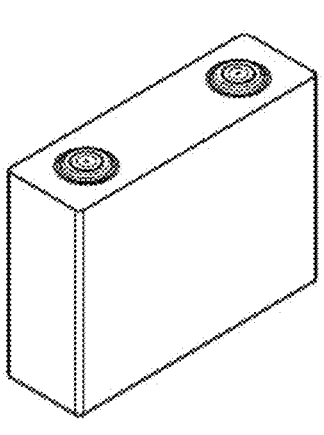
FIG. 1 is a three-dimensional diagram of a sodium-ion battery according to an embodiment.

The following describes the implementation solutions of this application in detail with reference to embodiments. A person skilled in the art understands that the following embodiments are merely intended to illustrate this application, but not intended to limit the scope of this application. Unless conditions are otherwise specified in the embodiments, conventional conditions or conditions recommended by the manufacturer apply. A reagent or instrument used herein without specifying the manufacturer is a conventional product that is commercially available from the market.

It needs to be noted that, unless otherwise specified herein, all embodiments and optional embodiments mentioned herein may be combined with each other to form a new technical solution. Unless otherwise specified herein, all technical features and optional technical features mentioned herein may be combined with each other to form a new technical solution. Unless otherwise specified herein, a percentage (%) or content means a weight percent or a weight content of an ingredient in a composite or mixture. Unless otherwise specified herein, ingredients and optional ingredients mentioned herein may be combined with each other to form a new technical solution. Unless otherwise specified herein, a numerical range "a~b" is a brief representation of a combination of any real numbers between a and b inclusive, where both a and b are real numbers. For example, the numerical range "6~22" means that all real numbers between 6 and 22 inclusive are enumerated herein, and "6~22" is just a brief representation of a combination of such numbers. A "range" disclosed herein is formed by a lower limit and an upper limit, and may be defined by one or more lower limits and one or more upper limits. Unless otherwise specified herein, each reaction or operation step mentioned herein may occur sequentially or non-sequentially. Optionally, a reaction method mentioned herein is performed sequentially.

Unless otherwise specified herein, professional terms and technical terms used herein have the same meanings as those well understood by a person skilled in the art. In addition, any method or material similar or equivalent to the content set forth herein may be applied to this application.

The following describes in detail a sodium-ion battery, a positive electrode plate for a sodium-ion battery, a positive active material for a sodium-ion battery, a battery module containing the sodium-ion battery disclosed herein, a battery pack, and a device.

First, a sodium-ion battery according to a first aspect of this application is described. The sodium-ion battery includes a positive electrode plate, a negative electrode plate, a separator, and an electrolytic solution. The positive electrode plate includes a positive active material. A molecular formula of the positive active material satisfies $Na_aLi_bM_{0.7}Fe_{0.3-b}O_{2\pm\delta}$, M is a transition metal ion, $0.67<a<1.1$, $0<b<0.3$, $0\leq\delta\leq0.1$, and a ratio of $R_{ct}$ to $R_f$ of the positive active material satisfies $1.0<R_{ct}/R_f<20.0$.

$R_{ct}$ is a charge transfer resistance of the positive active material measured in a button battery based on alternating current impedance spectroscopy.

$R_f$ is a diffusion resistance of the positive active material measured in the button battery based on the alternating current impedance spectroscopy.

$R_{ct}$ and $R_f$ are measured based on alternating current impedance spectroscopy. Specifically, the alternating current impedance spectroscopy is: applying a small-amplitude sinusoidal alternating current signal to an electrode to infinitesimally disturb a potential of the electrode near an equilibrium electrode potential, and, after the potential enters a steady state, measuring an amplitude and a phase of a response current (or voltage) signal to obtain complex impedances of the electrode consecutively; and then, according to an imaginary equivalent circuit, performing impedance spectroscopy analysis and parameter fitting to determine kinetic parameters ($R_{ct}$ and $R_f$) of reaction of the electrode.

A crystal system of the positive active material in the sodium-ion battery according to this application is a prismatic crystal system whose space group is R3m. A morphology of primary particle of the positive active material is a micron-sized flaky structure, and an internal structure of the primary particles is a layered structure.

Compared with $Li^+$ in the positive active material of the sodium-ion battery, other transition metal ions M have a higher valence and react with oxygen more strongly. As sodium ions are gradually deintercalated, other transition metal ions will have a higher valence, and bond to oxygen more strongly. Therefore, effective ingredients in the electrolytic solution will preemptively interact with $Li^+$ to form a stable CEI film to suppress gradual dissolution of other transition metal ions during charge and discharge. This defers or even eliminates a tendency that the impedance of the positive active material gradually increases with the increase of cycles, thereby improving the cycle performance of the material.

In the sodium-ion battery according to this application, the positive active material is a layered-structured transition metal oxide. The layered-structured transition metal oxide is doped with low-valence inactive transition metal Li to improve cycle stability of the positive active material. In the positive active material of the sodium-ion battery according to this application, $Li^+$ ions are added as an inactive dopant into the transition metal oxide, rather than existent in the form of intercalation and deintercalation. During charge and discharge, effective ingredients in an electrolytic solution preemptively interact with the $Li^+$ ions to form a stable cathode-electrolyte interface (CEI) film to suppress dissolution of other transition metal ions in the transition metal oxide, so as to improve the cycle performance of the positive active material. In order not to reduce a capacity of the positive active material, a doping amount of lithium ions in the positive active material in the sodium-ion battery in this application is controlled to be not greater than 0.3.

In addition, the inventor of this application finds that when the ratio of $R_{ct}$ to $R_f$ of the positive active material is too low, the positive active material has a relatively large diffusion resistance to sodium ions, thereby being adverse to effective intercalation and deintercalation of the sodium ions in the active material. When the $R_{ct}/R_f$ ratio value is too high, it indicates that a charge transfer resistance of the positive active material is relatively large, thereby adversely affecting the transition metal ion M in receiving and releasing electrons, and being adverse to exertion of electrical performance of the material.

Therefore, in the sodium-ion battery according to this application, the content of each metal ion in the positive active material is controlled so that the ratio of $R_{ct}$ to $R_f$ of the positive active material is controlled to be within the range of $1.0<R_{ct}/R_f<20.0$. This facilitates intercalation and deintercalation of the sodium ions in the positive active material, and makes the material keep a relatively low resistance force. Therefore, this facilitates receiving of the transition metal ions and release of electrons, so as to fully exert electrical performance of the positive active material.

Typically but without limitation, examples of the $R_{ct}/R_f$ ratio value of the positive active material may be 1.01, 1.3, 1.5, 1.8, 2.0, 2.2, 2.5, 2.8, 3.0, 3.2, 3.5, 3.8, 4.0, 4.2, 4.5, 4.8, 5.0, 5.2, 5.5, 5.8, 6.0, 6.2, 6.5, 6.8, 7.0, 7.5, 8.0, 8.5, 9.0, 9.5, 10.0, 11.0, 12.0, 13.0, 14.0, or 15.0.

In addition, in the positive active material of the sodium-ion battery according to this application, when the value of a is less than 0.67, a phase structure of the material is usually a P2 phase, and the corresponding electrical performance exhibits the P2 phase structure characteristics. For example, a first-cycle efficiency is higher than 100%, and a specific charge capacity is lower than a specific discharge capacity, thereby adversely affecting exertion of the electric performance of the material in a full battery. When the value of a is greater than 1.1, the material may exhibit an O3 phase. When the value of a is larger, the content of sodium ions is higher, the content of active sodium ions is possibly higher, and a capacitance is higher. However, when the value of a is too large, the valence of the transition metal and structural stability of the material will be affected.

The effect of the value of b is: When the value of b is too small, a stable CEI film is unable to be formed, and the dissolution of metal ions is suppressed; and, when the value of b is too large, the material will exhibit an impurity phase, and the exertion of the performance of the material will be affected.

When $\delta$ is too small, the material becomes an oxygen-deficient compound, and the structural stability of the material is not ensured. When $\delta$ is too large, the material becomes an oxygen-rich compound. The oxygen in the oxygen-rich compound may participate in an oxidation reaction. The reaction is irreversible and may affect the cycle performance of the material.

Therefore, in the positive active material of the sodium-ion battery according to this application, the value of a is $0.67<a<1.1$, the value of b is $0<b<0.3$, and the value of $\delta$ is $0\leq\delta\leq0.1$. In this application, typically but without limitation, examples of the value of a may be 0.67, 0.68, 0.7, 0.72, 0.74, 0.76, 0.78, 0.8, 0.82, 0.84, 0.86, 0.88, 0.9, 0.92, 0.94, 0.96, 0.98, 1.0, 1.02, 1.04, 1.06, 1.08, or 1.1.

Typically but without limitation, examples of the value of b may be 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3.

Typically but without limitation, examples of the value of 5 may be 0, 0.01, 0.02, 0.03, 0.04, 0.05, 0.06, 0.07, 0.08, 0.09, or 0.10.

In some optional embodiments of this application, the resistance of the positive active electrode plate is $R\leq1,000$ $m\Omega$, and optionally, $R\leq100$ $m\Omega$. The resistance of the positive electrode plate is less than or equal to 1,000 $m\Omega$, which ensures relatively high conductivity and transmission performance of the positive electrode plate.

In some optional embodiments of this application, the $R_{ct}/R_f$ ratio value satisfies $1.0 < R_{ct}/R_f < 18.0$, and optionally, $2.0 \leq R_{ct}/R_f < 15.0$. The $R_{ct}/R_f$ ratio value of the positive active material is optimized so that the positive active material achieves a higher specific discharge capacity and higher cycle performance.

In some embodiments of this application, the M in the molecular formula of the positive active material is at least one selected from $Ni^{2+}$, $Mn^{4+}$, $Co^{2+}$, $Cu^{2+}$, $Zn^{2+}$, $Mg^{2+}$, or $Al^{3+}$. Optionally, the M is at least one selected from $Ni^{2+}$, $Co^{2+}$, $Cu^{2+}$, or $Mn^{4+}$.

This application does not particularly specify the transition metal M as long as the transition metal M can be compounded with Fe and can generate a layered-structured oxide and can be used for intercalation and deintercalation of sodium ions.

Conventional transition metals used in sodium-ion batteries or lithium-ion batteries are applicable. In this embodiment, typically but without limitation, examples of the transition metal M may be at least one selected from $Ni^{2+}$, $Mn^{4+}$, $Co^{2+}$, $Cu^{2+}$, $Zn^{2+}$, $Mg^{2+}$, or $Al^{3+}$. Optionally, M is at least one selected from $Ni^{2+}$, $Co^{2+}$, $Cu^{2+}$, or $Mn^{4+}$. A mixture of the active metal and Mn ions is used, because the cost of manganese compounds is relatively low and achieves cost-efficiency of the material, and also because the mixture helps to increase the capacity of the material.

In some optional embodiments of this application, the value of b satisfies $0.05 < b < 0.2$, and optionally, $0.05 < b < 0.15$. The optimized doping amount of $Li^+$ ions can provide sufficient $Li^+$ ions for the formation of the CEI film, prevent the positive active material from generating excessive non-pure phase structures, and ensure structural stability of the positive active material.

In some optional embodiments of this application, a tapped density of the positive active material is greater than $1 \text{ g/cm}^3$, and optionally, $1.5 \sim 3 \text{ g/cm}^3$. The optimized tapped density of the positive active material can further improve a volumetric capacity of the positive active material, and optimize an internal resistance of the positive active material.

In this embodiment, typically but without limitation, examples of the tapped density of the positive active material may be $1 \text{ g/cm}^3$, $1.2 \text{ g/cm}^3$, $1.5 \text{ g/cm}^3$, $1.7 \text{ g/cm}^3$, $2.0 \text{ g/cm}^3$, $2.2 \text{ g/cm}^3$, $2.5 \text{ g/cm}^3$, $2.8 \text{ g/cm}^3$, or $3.0 \text{ g/cm}^3$.

In some optional embodiments of this application, a compacted density of the positive active material under 8 tons is $1.5 \sim 4.5 \text{ g/cm}^3$, and optionally, $2.5 \sim 4 \text{ g/cm}^3$.

The compacted density of the positive active material is controlled to be within the optional range to further increase a gram capacity of the positive active material, increase discharge capacity of the positive active material, decrease the internal resistance, and increase the cycle life of the positive active material.

In the foregoing embodiment, typically but without limitation, examples of the compacted density of the positive active material under 8 tons may be $1.5 \text{ g/cm}^3$, $1.7 \text{ g/cm}^3$, $2.0 \text{ g/cm}^3$, $2.2 \text{ g/cm}^3$, $2.5 \text{ g/cm}^3$, $2.8 \text{ g/cm}^3$, $3.0 \text{ g/cm}^3$, $3.2 \text{ g/cm}^3$, $3.5 \text{ g/cm}^3$, $3.8 \text{ g/cm}^3$, $4.0 \text{ g/cm}^3$, or $4.5 \text{ g/cm}^3$.

In some optional embodiments of this application, a median diameter $D_v50$ of the positive active material is $0.05 \sim 50$ μm, and optionally $3 \sim 30$ μm.

In other optional embodiments of this application, a specific surface area S of the positive active material is $0.01 \sim 30 \text{ m}^2/\text{g}$, and optionally, $0.1 \sim 10 \text{ m}^2/\text{g}$.

Research shows that both the particle size and the specific surface area of the positive active material are important physical parameters of the material. The particle size mainly reflects transmission kinetics of electrons and ions inside a particle. When the particle size is too large, a contact surface between the particle of the positive active material and conductive carbon is relatively small due to the too large particle size. Consequently, a diffusion path of electrons and ions inside the particle is longer, the transmission kinetics between different particles and between the particle and the conductive carbon are inferior ($R_{ct}$ or $R_f$ is too large), and polarization during charge and discharge is increased. As a result, the capacity and coulombic efficiency of the battery are relatively low, and the cycle capacity attenuation of the battery during cycles is relatively quick. A too small particle size mainly affects manufacturability of the electrode plate. The specific surface area is closely related to the particle size, shape, surface defects, and pore structure of the particle. Factors for a too small specific surface area may be related to a too large particle size and irregular shape of the material. Such factors reduce active sites in the material ($R_{ct}$ or $R_f$ is too large), and lead to inability of sufficiently exerting the capacity of the material. Factors for a too large specific surface area may be related to a too small particle size, surface defects, and many pore structures of the material. Such factors lead to increase of the active sites of the material, exacerbate side reactions, result in too large values of $R_{ct}$ or $R_f$ of the material. This adversely affects the cycle performance of the material, and leads to problems such as the material being more likely to agglomerate and difficult to disperse, and the electrode plate being difficult to process. Therefore, both the particle size and the specific surface area are controlled to be within an optional range.

As can be learned from the foregoing analysis, when the particles of the positive active material are too small, the particles have a relatively low crystallinity and relatively many chemical composition defects, thereby hindering exertion of electrochemical performance of the battery. In addition, when the particle of the material is too small and the specific surface area of the material is too large, liquid absorption will be drastic during stirring of a slurry. Consequently, a solid content of the slurry is relatively low, the electrode plate has streaks, and the compacted density is relatively low. This will further reduce the capacity, coulombic efficiency, and overall energy density of the battery. When the particle of the positive active material is too large and the specific surface area is too small, the contact surface between the particle and the conductive agent is relatively small. Consequently, a diffusion path of electrons and ions inside the particle is relatively long, and the transmission kinetics between different particles and between the particle and the conductive agent are inferior. This will reduce conductivity and ion transmission performance, increase polarization during charge and discharge, reduce the capacity and coulombic efficiency of the battery, and quicken the capacity attenuation during cycles.

By optimizing the particle size of the positive active material, this application reduces crystal defects of the positive active material, ensures exertion of the electrochemical performance, and also ensures good contact between different particles of the positive active material and between the particle and the conductive agent, so as to keep a high conductivity and excellent ion transmission kinetics, increase the capacity and coulombic efficiency of the battery, and improve cycle stability of the battery.

In the foregoing embodiment, typically but without limitation, the median diameter $D_v50$ of the positive active material may be 0.05 µm, 0.1 µm, 0.2 µm, 0.5 µm, 1 µm, 3 µm, 5 µm, 10 µm, 15 µm, 20 µm, 25 µm, 30 µm, 35 µm, 40 µm, 45 µm, or 50 µm.

Typically but without limitation, examples of the specific surface area S of the positive active material may be 0.01 m$^2$/g, 0.05 m$^2$/g, 0.1 m$^2$/g, 0.2 m$^2$/g, 0.5 m$^2$/g, 1 m$^2$/g, 3 m$^2$/g, 5 m$^2$/g, 10 m$^2$/g, 15 m$^2$/g, 20 m$^2$/g, 25 m$^2$/g, or 30 m$^2$/g.

In some embodiments of this application, $R_{ct}/R_f$, the median diameter $D_v50$ (µm), and the specific surface area S (m$^2$/g) satisfy $$0.3 < \frac{R_{ct}/R_f * D_v50}{S} < 6000,$$

and optionally, satisfy $$0.6 < \frac{R_{ct}/R_f * D_v50}{S} < 4500.$$

By optimizing relationships between $R_{ct}/R_f$, $D_v50$, and S, this application further optimizes the electrical performance of the positive active material, and ensure a relatively high cycle stability while ensuring a high capacity of the material.

In some embodiments of this application, the negative active material in the negative electrode plate is a carbon material, and optionally, a hard carbon material.

An areal density A (g/m$^2$) of a single-sided positive active material layer of the positive electrode plate and an areal density B (g/m$^2$) of a single-sided negative active material layer of the negative electrode plate satisfy: 1.8<A/B<2.57, and optionally, 2.2<A/B<2.47.

Research shows that, when the positive active material according to this application is applied to a positive electrode plate, all performance indicators of the sodium-ion battery are relatively high after the sodium-ion battery is prepared by using a negative active material, where the negative active material is made of a carbon material, especially a hard carbon material. Therefore, the sodium-ion battery according to this application optionally uses hard carbon as the negative active material.

The A/B ratio value represents control of a negative electrode redundancy. The exertion of the capacity of the sodium-ion battery is ensured as long as the A/B ratio value is controlled to be within a specific range. Experiments verify that when the A/B ratio value is controlled to be within the foregoing range, the first-cycle coulombic efficiency and the energy density of the sodium-ion battery are improved, and sodium plating on the negative electrode plate is prevented during charge and discharge.

The sodium-ion battery according to this application is characterized by high cycle stability, high safety, and high industrial manufacturability, and embraces an enormous application prospect in the field of large-scale energy storage.

The method for preparing the sodium-ion battery according to this application is identical to a conventional method for preparing a lithium metal battery. For example, a jelly-roll sodium metal battery or a stacked sodium metal battery may be made by using the positive electrode plate and the negative electrode plate according to this application and by adding a separator and an electrolytic solution.

The following briefly describes a negative electrode plate, a separator, and an electrolytic solution according to this application.

The negative electrode plate according to this application includes a negative current collector and a negative active material disposed on at least one surface of the negative current collector.

The negative current collector according to this application may be, but is not limited to, a metal foil, and more specifically, may be, but is not limited to, a nickel foil or an aluminum foil.

The separator of the sodium-ion battery according to this application may be made of any of various materials suitable for use as a separator of an electrochemical energy storage device in this field. For example, the material may be, but is not limited to, one of or any combination of polyethylene, polypropylene, polyvinylidene fluoride, aramid fiber, polyethylene terephthalate, polytetrafluoroethylene, polyacrylonitrile, polyimide, polyamide, polyester, or natural fiber.

The electrolytic solution in the sodium-ion battery according to this application usually includes an electrolyte and a solvent, and a solute in the electrolytic solution is a sodium salt. The solvent may be any of various solvents applicable to the electrolytic solution of an electrochemical energy storage device in this field, is usually a nonaqueous solvent, and optionally may be an organic solvent. Specifically, the solvent may be, but is not limited to, one of or any combination of ethylene carbonate, propylene carbonate, butylene carbonate, pentene carbonate, dimethyl carbonate, diethyl carbonate, dipropyl carbonate, ethyl methyl carbonate, or a halogenated derivative thereof.

According to a second aspect of this application, this application provides a positive electrode plate for a sodium-ion battery. The positive electrode plate includes a positive active material layer carried on at least one surface of a positive current collector. The positive active material layer includes a positive active material. A molecular formula of the positive active material satisfies $Na_aLi_bM_{0.7}Fe_{0.3-b}O_{2\pm\delta}$, M is a transition metal ion, 0.67<a<1.1, 0<b<0.3, 0≤δ≤0.1, and a ratio of $R_{ct}$ to $R_f$ of the positive active material satisfies 1.0<$R_{ct}/R_f$<20.0;

$R_{ct}$ is a charge transfer resistance of the positive active material measured in a button battery based on alternating current impedance spectroscopy.

$R_f$ is a diffusion resistance of the positive active material measured in the button battery based on the alternating current impedance spectroscopy.

$R_{ct}$ and $R_f$ are measured based on alternating current impedance spectroscopy with respect to a sodium-ion button battery made of the foregoing positive active material. Specifically, the alternating current impedance spectroscopy is: applying a small-amplitude sinusoidal alternating current signal to an electrode to infinitesimally disturb a potential of the electrode near an equilibrium electrode potential, and, after the potential enters a steady state, measuring an amplitude and a phase of a response current (or voltage) signal to obtain complex impedances of the electrode consecutively; and then, according to an imaginary equivalent circuit, performing impedance spectroscopy analysis and parameter fitting to determine kinetic parameters ($R_{ct}$ and $R_f$) of reaction of the electrode.

In the positive electrode plate according to this application, the positive active material is a layered-structured transition metal oxide. The layered-structured transition metal oxide is doped with low-valence inactive transition metal Li to improve cycle stability of the positive active material. In the positive active material according to this application, $Li^+$ ions are added as an inactive dopant into the transition metal oxide, rather than existent in the form of intercalation and deintercalation. During charge and discharge, effective ingredients in an electrolytic solution preemptively interact with the $Li^+$ ions to form a stable cathode-electrolyte interface (CEI) film to suppress dissolution of other transition metal ions in the transition metal oxide, so as to improve the cycle performance of the positive active material. In order not to reduce a capacity of the positive active material, a doping amount of lithium ions in the positive active material in this application is controlled to be not greater than 0.3.

In addition, the content of each metal ion in the positive active material is controlled so that the ratio of $R_{ct}$ to $R_f$ of the positive active material is controlled to be within the range of $1.0 < R_{ct}/R_f < 20.0$. This facilitates intercalation and deintercalation of sodium ions in the positive active material, and facilitates receiving of the transition metal ions and release of electrons, so as to fully exert electrical performance of the positive active material.

The positive electrode plate further includes but is not limited to a binder, a conductive agent, and the like in addition to the positive active material.

The binder and the conductive agent in the positive electrode plate and the type and content thereof are not specifically limited, and may be selected according to actual needs.

The binder usually includes a fluorine-containing polyolefin-based binder. The fluorine-containing polyolefin-based binder includes but is not limited to a polyvinylidene difluoride (PVDF), or a vinylidene fluoride copolymer, a modified derivative thereof (for example, a modified derivative of carboxylic acid, acrylic acid, or acrylonitrile), or the like. In the positive electrode material, due to a low conductivity of the binder, a too large dosage of the binder needs to be avoided. Optionally, a weight percent of the binder in the positive electrode material is less than or equal to 2 wt %, so as to achieve a relatively low resistance of the electrode plate.

The conductive agent may be any of various conductive agents applicable to a sodium-ion (secondary) battery or a lithium-ion battery in this field. For example, the conductive agent may be, but is not limited to, one of or any combination of acetylene black, conductive carbon black, vapor grown carbon fiber (VGCF), carbon nanotubes (CNT), Ketjen black, and the like. The weight of the conductive agent may be 1 wt %~10 wt % of a total weight of the positive electrode material.

The type of the positive current collector in the positive electrode plate is not limited, and may be selected according to actual needs. The positive current collector may be usually a layered structure. The positive current collector is usually a structure or a part capable of collecting current. The positive current collector may be any of various materials suitable for use as a positive current collector of an electrochemical energy storage device in this field. For example, the positive current collector may be, but is not limited to, a metal foil. More specifically, the positive current collector may be, but is not limited to, a nickel foil or an aluminum foil.

According to a second aspect of this application, this application provides a positive active material for a sodium-ion battery. A molecular formula of the positive active material satisfies $Na_aLi_bM_{0.7}Fe_{0.3-b}O_{2\pm\delta}$, M is a transition metal ion, $0.67 < a < 1.1$, $0 < b < 0.3$, and $0 \leq \delta \leq 0.1$.

A ratio of $R_{ct}$ to $R_f$ of the positive active material satisfies $1.0 < R_{ct}/R_f < 20.0$.

$R_{ct}$ is a charge transfer resistance of the positive active material measured in a button battery based on alternating current impedance spectroscopy.

$R_f$ is a diffusion resistance of the positive active material measured in the button battery based on the alternating current impedance spectroscopy.

$R_{ct}$ and $R_f$ are measured based on alternating current impedance spectroscopy with respect to a sodium-ion button battery made of the foregoing positive active material. Specifically, the alternating current impedance spectroscopy is: applying a small-amplitude sinusoidal alternating current signal to an electrode to infinitesimally disturb a potential of the electrode near an equilibrium electrode potential, and, after the potential enters a steady state, measuring an amplitude and a phase of a response current (or voltage) signal to obtain complex impedances of the electrode consecutively; and then, according to an imaginary equivalent circuit, performing impedance spectroscopy analysis and parameter fitting to determine kinetic parameters ($R_{ct}$ and $R_f$) of reaction of the electrode.

The positive active material according to this application is a layered-structured transition metal oxide. The layered-structured transition metal oxide is doped with low-valence inactive transition metal Li to improve cycle stability of the positive active material. In the positive active material according to this application, $Li^+$ ions are added as an inactive dopant into the transition metal oxide, rather than existent in the form of intercalation and deintercalation. During charge and discharge, effective ingredients in an electrolytic solution preemptively interact with the $Li^+$ ions to form a stable cathode-electrolyte interface (CEI) film to suppress dissolution of other transition metal ions in the transition metal oxide, so as to improve the cycle performance of the positive active material. In order not to reduce a capacity of the positive active material, a doping amount of lithium ions in the positive active material in this application is controlled to be not greater than 0.3.

In addition, the content of each metal ion in the positive active material is controlled so that the ratio of $R_{ct}$ to $R_f$ of the positive active material is controlled to be within the range of $1.0 < R_{ct}/R_f < 20.0$. This facilitates intercalation and deintercalation of sodium ions in the positive active material, and facilitates receiving of the transition metal ions and release of electrons, so as to fully exert electrical performance of the positive active material.

The positive active material according to this application may be prepared by using a conventional sintering method.

An example of the preparation method is: Preparing a $M(OH)_2$ precursor by means of co-precipitation by using $MSO_4$ as a metal source, ammonia as a complexant, and NaOH as a precipitant, where the concentration of the ammonia is 0.2~1 mol/L; and sufficiently milling $Na_2CO_3$, $Li_2CO_3$, $Fe_3O_4$, and the $M(OH)_2$ precursor at a specific mixing ratio, and sintering the milled mixture in an 850~1, 000° C. tube furnace for 10~20 hours (such as 15 hours) to obtain an ultimate $Na_aLi_bM_{0.7}Fe_{0.3-b}O_{2\pm\delta}$ positive active material.

Figure 2:
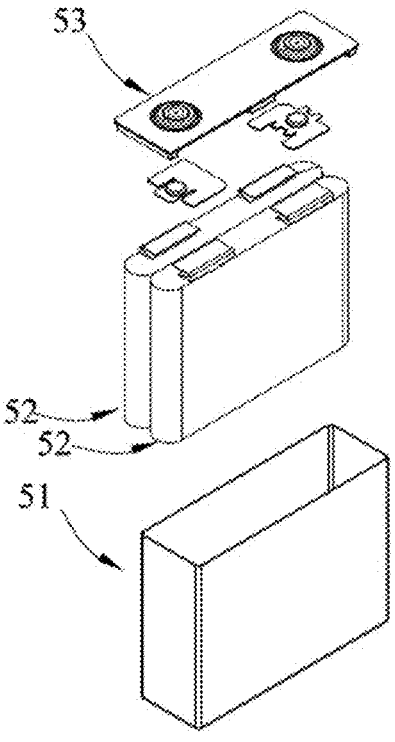
FIG. 2 is an exploded view of FIG. 1.
Figure 3:
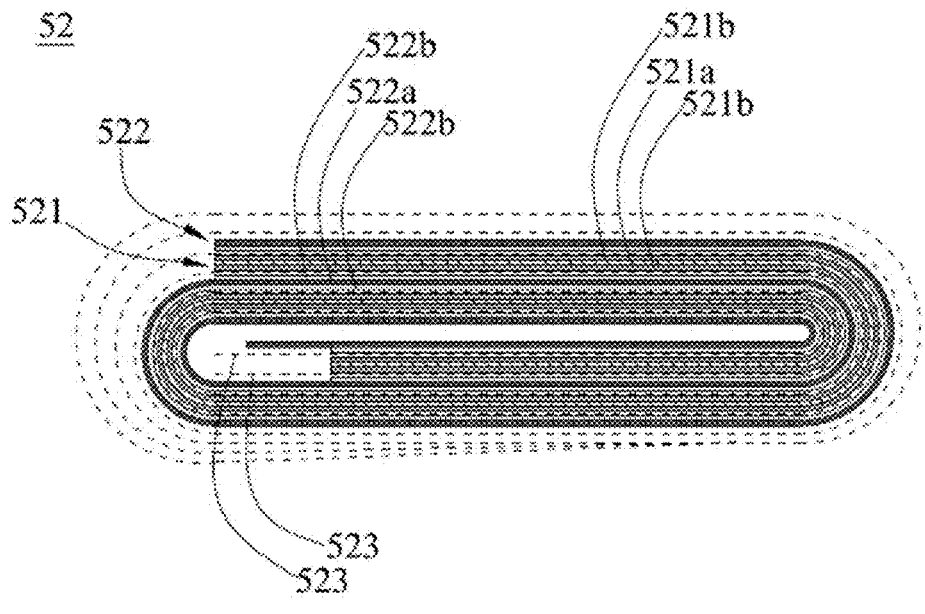
FIG. 3 is a schematic diagram of an electrode assembly of the sodium-ion battery shown in FIG. 2 according to an embodiment, in which a first electrode plate, a second electrode plate and a separator are wound to form a jelly-roll electrode assembly.
Figure 4:
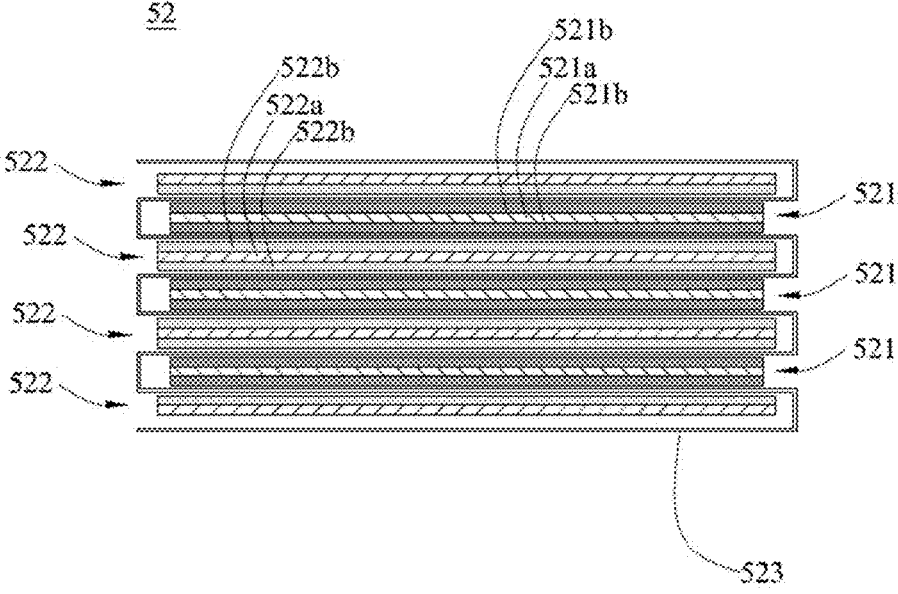
FIG. 4 is a schematic diagram of an electrode assembly of the sodium-ion battery shown in FIG. 2 according to another embodiment, in which a first electrode plate, a second electrode plate and a separator are stacked in a thickness direction to form a stacked electrode assembly.

FIG. 1 is a three-dimensional diagram of a sodium-ion battery 5 according to an embodiment. FIG. 2 is an exploded view of FIG. 1. FIG. 3 is a schematic diagram of an electrode assembly 52 of the sodium-ion battery 5 shown in FIG. 2 according to an embodiment, in which a first electrode plate 521, a second electrode plate 522 and a separator 523 are wound to form a jelly-roll electrode assembly. FIG. 4 is a schematic diagram of an electrode assembly 52 of the sodium-ion battery 5 shown in FIG. 2 according to another embodiment, in which a first electrode plate 521, a second electrode plate 522 and a separator 523 are stacked along a thickness direction to form a stacked electrode assembly.

Referring to FIG. 1 to FIG. 4, the sodium-ion battery 5 includes a housing 51, an electrode assembly 52, a top cover assembly 53, and an electrolytic solution (not shown).

The electrode assembly 52 is accommodated in the housing 51. The electrode assembly 52 includes the first electrode plate 521, the second electrode plate 522, the separator 523, a first tab 524, and a second tab 525. The separator 523 separates the first electrode plate 521 from the second electrode plate 522.

The first electrode plate 521 includes a first current collector 521a and a first active material layer 521b disposed on a surface of the first current collector 521a. The first active material layer 521b includes a first active material. The first active material layer 521b may be disposed on one surface or two surfaces of the first current collector 521a according to actual needs. The second electrode plate 522 includes a second current collector 522a and a second active material layer 522b disposed on a surface of the second current collector 522a. The second active material layer 522b may be disposed on one surface or two surfaces of the second current collector 522a according to actual needs. The second active material layer 522b includes a second active material. The first active material and the second active material deintercalate lithium ions. The first electrode plate 521 is electrically opposite to the second electrode plate 522. Specifically, one of the first electrode plate 521 or the second electrode plate 522 is a positive electrode plate, and the other of the first electrode plate 521 or the second electrode plate 522 is a negative electrode plate. The first tab 524 may be formed by cutting the first current collector 521a or separately formed, and fixedly connected to the first current collector 521a. Similarly, the second tab 525 may be formed by cutting the second current collector 522a or separately formed, and fixedly connected to the second current collector 522a.

The quantity of electrode assemblies 52 is not limited, and may be one or more.

The electrolytic solution is injected into the housing 51 and infiltrates the electrode assembly 52, and specifically infiltrates the first electrode plate 521, the second electrode plate 522, and the separator 523.

It needs to be noted that the sodium-ion battery 5 shown in FIG. 1 is, but without limitation, a can-shaped battery. The sodium-ion battery 5 may also be a pouch-shaped battery, in which the housing 51 is replaced with a metal laminated film and the top cover assembly 53 is canceled.

In the sodium-ion battery 5, one of the first electrode plate 521 or the second electrode plate 522 is a positive electrode plate. Therefore, a current collector of the positive electrode plate is a positive current collector, and an active material layer of the positive electrode plate is a positive active material layer. An active material of the positive electrode plate is a positive active material. Accordingly, the positive electrode plate includes the positive current collector and the positive active material layer disposed on the positive current collector.

In other words, the sodium-ion battery according to the first aspect of this application includes the positive electrode plate, the negative electrode plate, the separator, and the electrolytic solution.

According to a fourth aspect of this application, this application provides a battery module, including the sodium-ion battery according to the first aspect of this application.

Figure 5:
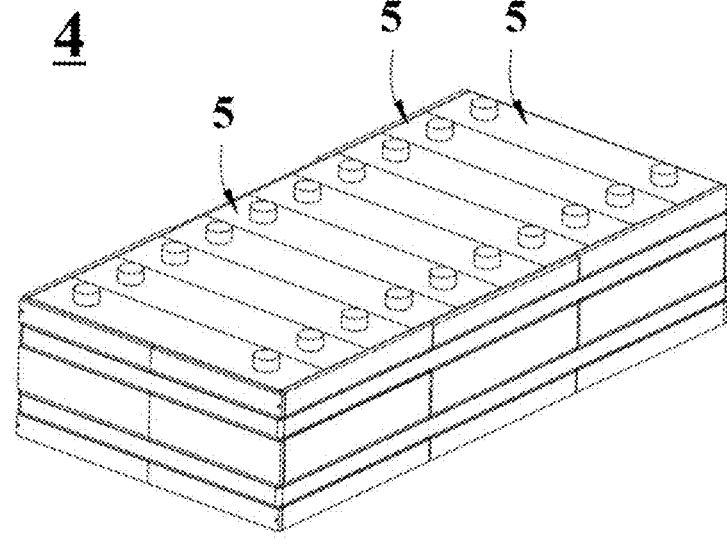
FIG. 5 is a three-dimensional diagram of a battery module according to an embodiment.

FIG. 5 is a three-dimensional diagram of a battery module 4 according to an embodiment.

Referring to FIG. 5, the battery module 4 includes a plurality of the sodium-ion batteries 5. The plurality of sodium-ion batteries 5 are arranged in a longitudinal direction. The battery module 4 may be used as a power supply or an energy storage device. The quantity of the sodium-ion batteries 5 in the battery module 4 may be adjusted according to an application scenario and a capacity of the battery module 4.

According to a fifth aspect of this application, this application provides a battery pack, including the battery module according to the fourth aspect of this application.

Figure 6:
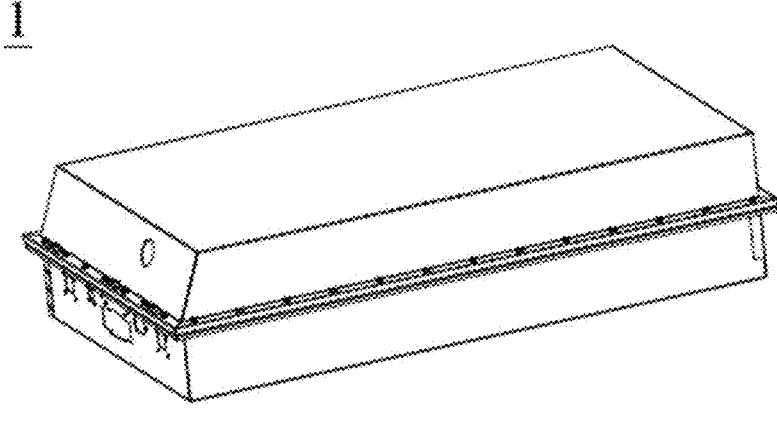
FIG. 6 is a three-dimensional diagram of a battery pack according to an embodiment.
Figure 7:
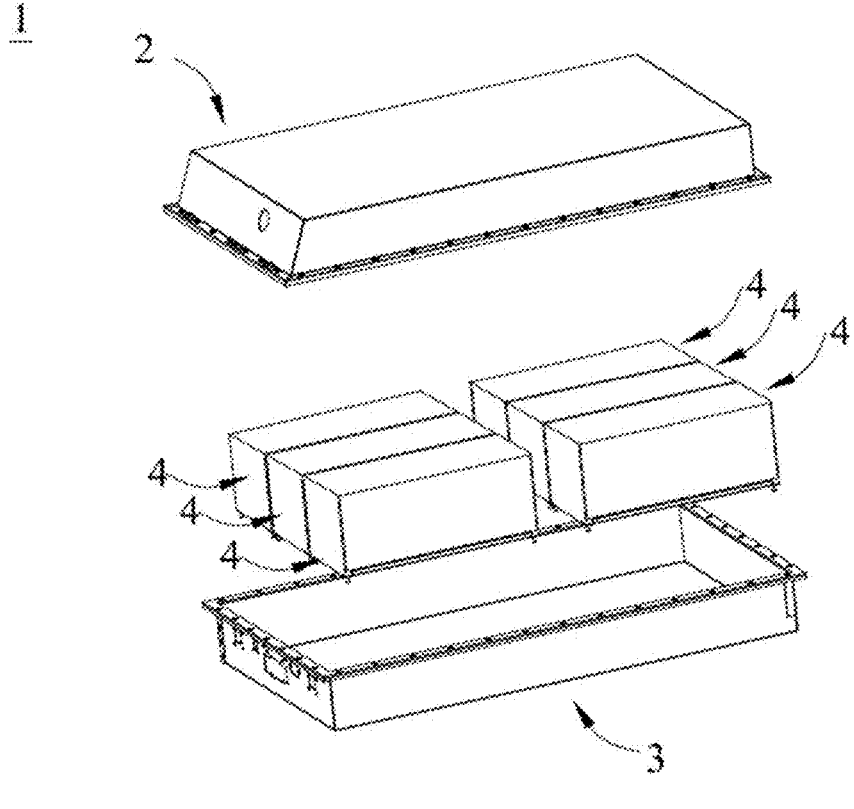
FIG. 7 is an exploded view of FIG. 6.

FIG. 6 is a three-dimensional diagram of a battery pack 1 according to an embodiment. FIG. 7 is an exploded view of FIG. 6.

Referring to FIG. 6 and FIG. 7, the battery pack 1 includes an upper box 2, a lower box 3, and a battery module 4.

The upper box 2 and the lower box 3 are assembled together to form a space for accommodating the battery module 4. The battery module 4 is fitted into a space formed by assembling the upper box 2 and the lower box 3 together. An output electrode of the battery module 4 is led out from either the upper box 2 or the lower box 3 or from between the upper box 2 and the lower box 3 so as to supply power to an external device or to be charged from an external source. The quantity and arrangement of battery modules 4 adopted by the battery pack 1 may be determined according to actual needs. The battery pack 1 may be used as a power supply or an energy storage device.

According to a sixth aspect of this application, this application provides a device that uses a sodium-ion battery as a power supply. The device includes the sodium-ion battery according to the first aspect of this application or the battery pack according to the fifth aspect of this application.

Figure 8:
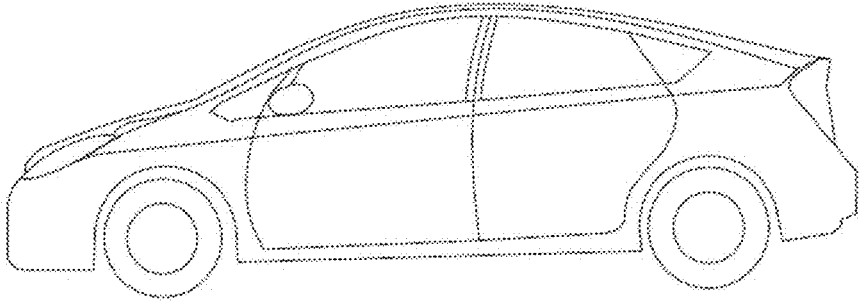
FIG. 8 is a schematic diagram of a device that uses a battery as a power supply according to an embodiment.

In FIG. 8, the device that adopts the sodium-ion battery 5 is an electric vehicle. Nevertheless, without being limited to the electric vehicle, the device that adopts the sodium-ion battery 5 may be any electric means of transport other than the electric vehicle (for example, an electric bus, an electric tram, an electric bicycle, an electric motorcycle, an electric scooter, an electric golf cart, and an electric truck), an electric ship, an electric tool, an electronic device, and an energy storage system. The electric vehicle may be a battery electric vehicle, a hybrid electric vehicle, or a plug-in hybrid electric vehicle. Depending on the actual use form, the device according the sixth aspect of this application may include the battery module 4 according to the fourth aspect of this application. The device according to the sixth aspect of this application may also include the battery pack 1 according to the fifth aspect of this application.

The following describes the sodium-ion battery in this application in more detail with reference to embodiments and comparative embodiments.

Embodiment 1

(1) Preparing a Positive Active Material

A method for preparing a positive active material includes: preparing a $Ni_{0.25}Mn_{0.75}(OH)_2$ precursor by means of co-precipitation by using $NiSO_4 \cdot 6H_2O$ and $MnSO_4 \cdot H_2O$ as a metal source, ammonia as a complexant, and NaOH as a precipitant, where the concentration of the ammonia is 0.3 mol/L; and sufficiently milling $Na_2CO_3$, $Li_2CO_3$, $Fe_3O_4$, and the $Ni_{0.25}Mn_{0.75}(OH)_2$ precursor at a specific mixing ratio, and sintering the milled mixture in a 900° C. tube furnace for 15 hours to obtain a positive active material S1. Composition of the positive active material S1 is $Na_{0.85}Li_{0.05}$ $(N_{10.25}Mn_{0.75})_{0.7}Fe_{0.25}O_2$, the median diameter $D_v50$ is 28.5 μm, a Brunauer-Emmett-Teller (BET) specific surface area is 1.2 m$^2$/g, and the $R_{ct}/R_f$ ratio value of the positive active material is 3.18.

(2) Preparing a Positive Electrode Plate

A method for preparing a positive electrode plate includes: mixing the positive active material $Na_{0.85}Li_{0.05}$ $(Ni_{0.25}Mn_{0.75})_{0.7}Fe_{0.25}O_2$ prepared in Embodiment 1, conductive carbon, and polyvinylidene difluoride (PVDF) as a binder at a weight ratio of 80:15:5, stirring the mixture well in an appropriate amount of N-methyl-pyrrolidone (NMP for short) solvent to form a homogeneous positive slurry; and then coating a surface of a carbon-coated aluminum foil of the positive current collector with the positive slurry, and performing steps such as drying and cold calendering to obtain a positive electrode plate, where an areal density A of a single-sided positive active material layer is 108.7 g/m$^2$.

(3) Preparing an Electrolytic Solution

A method for preparing an electrolytic solution includes: dissolving $NaClO_4$ in a solvent of ethylene carbonate (EC) and propylene carbonate (PC) mixed at a volumetric ratio of 1:1, and adding fluoroethylene carbonate (FEC) as an additive into the solvent to make an electrolytic solution.

(4) Preparing a Negative Electrode Plate

A method for preparing a negative electrode plate includes: mixing hard carbon as a negative active material, conductive carbon, SD-3 as a binder, and carboxymethyl cellulose (CMC) as a thickener at a weight ratio of 91.6%: 1.6%: 4.8%: 2.0%, dispersing the materials in deionized water as a solvent to form a homogeneous negative slurry, coating a negative current collector with the negative slurry, and performing steps such as drying and cold calendering to obtain a negative electrode plate, where an areal density B of a single-sided negative active material layer is 44.8 g/m$^2$.

(5) Providing Glass Fiber as a Separator (6) Preparing a battery: A method for preparing a battery includes: stacking the positive electrode plate, the separator, and the negative electrode plate sequentially so that the separator is located between the positive electrode plate and the negative electrode plate to serve a separation function, and injecting the prepared electrolytic solution into a dried battery cell to complete preparing a battery.

Embodiments 2~15

Embodiments 2~15 each provide a sodium-ion battery, and differ from Embodiment 1 in active materials and electrode plate parameters of the positive electrode or negative electrode in the sodium-ion battery. For details, see Table 1 and Table 2.

Comparative Embodiments 1~3

Comparative Embodiments 1~3 each provide a sodium-ion battery, and differ from Embodiment 1 in active materials and electrode plate parameters of the positive electrode or negative electrode in the sodium-ion battery. For details, see Table 1.

Material testing and measurement methods are described below:

(1) A Method for Measuring $D_v50$ is as Follows:

$D_v50$ may be measured conveniently by using a laser particle size analyzer such as a Mastersizer 2000E laser particle size analyzer of Britain-based Malvern Instruments Ltd. based on the GB/T 19077-2016 *Particle Size Distribution—Laser Diffraction Method*. Specific principles are:

dispersing particle samples at an appropriate concentration in a suitable liquid and gas, and passing a monochromatic beam (usually a laser beam) through the liquid or gas, so that the beam is scattered at different angles after encountering the particles; and measuring the scattered beam by using a multi-element infrared detector, and storing these values related to scattering patterns for subsequent analysis; and based on an appropriate optical model and mathematical process, converting the quantitative scattering data to obtain percentages of the volume of particles on a series of discrete particle size segments in relation to a total volume of all particles, so as to obtain a volume distribution of particle sizes, where $D_v50$ is a median of the volume distribution of particle sizes.

(2) A Method for Measuring a Specific Surface Area S is as Follows:

A reference standard may be GB/T 19587-2017 *Determination of Specific Surface Area of Solids By Gas Adsorption Using BET Method*; the specific surface area is measured by using a specific surface area analysis and test method by means of nitrogen adsorption, and the value of the specific surface area is calculated by using a Brunauer Emmett Teller (BET) method. The specific surface area analysis and test by means of nitrogen adsorption may be performed by using a Tri Star II 3020 specific surface and porosity analyzer of US-based Micromeritics Company.

(3) A Method for Measuring $R_{ct}$ and $R_f$ is as Follows:

$R_{ct}$ and $R_f$ are measured based on alternating current impedance spectroscopy with respect to a sodium-ion button battery made of the foregoing positive active material. Specifically, the alternating current impedance spectroscopy is: applying a small-amplitude sinusoidal alternating current signal to an electrode to infinitesimally disturb a potential of the electrode near an equilibrium electrode potential, and, after the potential enters a steady state, measuring an amplitude and a phase of a response current (or voltage) signal to obtain complex impedances of the electrode consecutively; and then, according to an imaginary equivalent circuit, performing impedance spectroscopy analysis and parameter fitting to determine kinetic parameters ($R_{ct}$ and $R_f$) of reaction of the electrode.

A method for preparing the sodium-ion button battery used in the measurement method includes the following steps.

(S1) Preparing a positive electrode plate

A method for preparing a positive electrode plate includes: mixing the positive active material, conductive carbon, and polyvinylidene difluoride (PVDF) as a binder at a weight ratio of 80:15:5, stirring the mixture well in an appropriate amount of N-methyl-pyrrolidone (NMP for short) solvent to form a homogeneous positive slurry; and then coating a surface of a carbon-coated aluminum foil of a positive current collector with the positive slurry, drying the slurry, and punching the aluminum foil into small wafers of 14 mm in diameter. The positive active material in this embodiment is $Na_{0.85}Li_{0.05}(Ni_{0.25}Mn_{0.75})_{0.7}Fe_{0.25}O_2$, and the particle size of the positive active material is 28.5 μm.

(S2) Preparing an electrolytic solution

A method for preparing an electrolytic solution includes: dissolving $NaClO_4$ in a solvent of ethylene carbonate (EC) and propylene carbonate (PC) mixed at a volumetric ratio of 1:1, and adding fluoroethylene carbonate (FEC) as an additive into the solvent to make an electrolytic solution.

(S3) Providing a metal sodium plate as a negative electrode plate (S4) Providing glass fiber as a separator (S5) Preparing a button battery: A method for preparing a button battery includes: stacking the positive electrode plate, the separator, and the negative electrode plate sequentially so that the separator is located between the positive electrode plate and the negative electrode plate to serve a separation function, and injecting the prepared electrolytic solution into a dried battery cell to complete preparing a button battery.

(4) Measuring a 0.1 C First-Cycle Specific Discharge Capacity

A measurement method includes: taking the sodium-ion batteries prepared in the embodiments and comparative embodiments, charging the sodium-ion battery at a normal temperature (23±2° C.) and a normal pressure (0.1 Mpa) and at a constant current of 0.1 C until the voltage reaches an upper limit of a charge-discharge cut-off voltage (4.2 V), and recording a charge capacity at this time as a first-cycle specific charge capacity of the battery; leaving the battery to stand for 5 minutes, then discharging the battery at a constant current of 0.1 C until the voltage reaches a lower limit of the charge-discharge cut-off voltage (2 V), and leaving the battery to stand for 5 minutes, thereby completing a charge-discharge cycle. The specific discharge capacity at this time is the first-cycle specific discharge capacity of the sodium-ion battery.

(5) Measuring a First-Cycle Direct Current Resistance (DCR) of a Battery

The DCR is measured typically by using a charger & discharger and a high/low temperature thermostat. A specific test method is: adjusting the thermostat to a normal temperature, leaving the thermostat to stay until reaching a thermal equilibrium, performing a 1 C charge-discharge cycle test on a fresh battery to obtain a measured capacity C0, leaving the battery to stand for 5 minutes, charging the battery at a current of 1 C0 until the voltage reaches 4 V, keeping a constant voltage of I≤0.2 C0, leaving the battery to stand for 60 minutes, discharging the battery at a current of 1 C0 for 30 minutes, adjusting the battery to 50% SOC, recording the voltage at this time as V1, leaving the battery to stand for 60 minutes, discharging the battery in this SOC state in a pulsed manner at a current of 4 C for 30 seconds, recording the voltage at this time as V2, and, according to DCR=(V1−V2)/4C0, calculating the first-cycle DCR of the battery in a 50% SOC state.

(6) Measuring a Direct Current Resistance (DCR) of a Battery after 100 Cycles

The test method is the same as (5) above, but differs in that the battery for testing is a battery that has been charged and discharged for 100 cycles.

(7) 0.1 C Capacity Retention Rate of the Battery after 100 Cycles

A method for measuring a 0.1 C capacity retention rate of the battery after 100 cycles includes: taking the sodium-ion batteries prepared in the embodiments and comparative embodiments, charging the sodium-ion battery at a normal temperature (23±2° C.) and a normal pressure (0.1 Mpa) and at a constant current of 0.1 C until the voltage reaches an upper limit (4.2 V) of a charge-discharge cut-off voltage; leaving the battery to stand for 5 minutes, then discharging the battery at a constant current of 0.1 C until the voltage reaches a lower limit (2 V) of the charge-discharge cut-off voltage; and leaving the battery to stand for 5 minutes, thereby completing a charge-discharge cycle; recording the discharge capacity at this time as a 0.1 C first-cycle specific discharge capacity of the sodium-ion battery; completing 100 charge and discharge cycles by repeating the foregoing process to obtain a 100th-cycle specific discharge capacity; and dividing the 0.1 C 100th-cycle specific discharge capacity by the 0.1 C first-cycle specific discharge capacity to obtain a 0.1 C 100th-cycle capacity retention rate of the sodium-ion battery.

Table 1 and Table 2 show test results of performance parameters the positive active material and the sodium-ion battery in Embodiments 1~15 and Comparative Embodiments 1~3.

TABLE 1

| Serial number | Chemical formula | $D_v50$ (μm) | Specific surface area S (m²/g) | First-cycle $R_{ct}/R_f$ | 100th-cycle $R_{ct}/R_f$ | 0.1 C. first-cycle specific discharge capacity (mAh/g) | 0.1 C. 100th-cycle capacity retention rate (%) |
|---|---|---|---|---|---|---|---|
| Positive electrode material S1 | $Na_{0.85}Li_{0.05}(Ni_{0.25}Mn_{0.75})_{0.7}Fe_{0.25}O_2$ | 28.5 | 1.2 | 3.18 | 10.84 | 120.7 | 91.6 |
| Positive electrode material S2 | $Na_{0.85}Li_{0.1}(Ni_{0.25}Mn_{0.75})_{0.7}Fe_{0.2}O_2$ | 28.5 | 1.2 | 2.71 | 4.19 | 133.5 | 95.5 |
| Positive electrode material S3 | $Na_{0.85}Li_{0.15}(Ni_{0.25}Mn_{0.75})_{0.7}Fe_{0.15}O_2$ | 28.5 | 1.2 | 3.47 | 8.91 | 118.2 | 88.7 |
| Positive electrode material S4 | $Na_{0.85}Li_{0.175}(Ni_{0.25}Mn_{0.75})_{0.7}Fe_{0.125}O_2$ | 28.5 | 1.2 | 4.94 | 10.84 | 117.4 | 85.3 |
| Positive electrode material S5 | $Na_{0.85}Li_{0.2}(Ni_{0.25}Mn_{0.75})_{0.7}Fe_{0.1}O_2$ | 28.5 | 1.2 | 6.37 | 15 | 115.8 | 80.4 |
| Positive electrode material S6 | $Na_{0.85}Li_{0.1}(Ni_{0.25}Mn_{0.75})_{0.7}Fe_{0.2}O_2$ | 0.05 | 30 | 1.21 | 1.01 | 140.9 | 80.2 |
| Positive electrode material S7 | $Na_{0.85}Li_{0.1}(Ni_{0.25}Mn_{0.75})_{0.7}Fe_{0.2}O_2$ | 3 | 10 | 1.53 | 1.22 | 138.6 | 81.8 |
| Positive electrode material S8 | $Na_{0.85}Li_{0.1}(Ni_{0.25}Mn_{0.75})_{0.7}Fe_{0.2}O_2$ | 10 | 7.6 | 2 | 3.36 | 135.7 | 88.3 |

TABLE 1-continued

| Serial number | Chemical formula | $D_v50$ (μm) | Specific surface area S (m²/g) | First-cycle $R_{ct}/R_f$ | 100th-cycle $R_{ct}/R_f$ | 0.1 C. first-cycle specific discharge capacity (mAh/g) | 0.1 C. 100th-cycle capacity retention rate (%) |
|---|---|---|---|---|---|---|---|
| Positive electrode material S9 | $Na_{0.85}Li_{0.1}(Ni_{0.25}Mn_{0.75})_{0.7}Fe_{0.2}O_2$ | 30 | 1.15 | 3.5 | 5.86 | 132.4 | 94.2 |
| Positive electrode material S10 | $Na_{0.85}Li_{0.1}(Ni_{0.25}Mn_{0.75})_{0.7}Fe_{0.2}O_2$ | 50 | 0.12 | 10 | 15 | 118.7 | 90.1 |
| Positive electrode material S11 | $Na_{0.85}Li_{0.1}(Cu_{0.25}Mn_{0.75})_{0.7}Fe_{0.2}O_2$ | 28.5 | 1.2 | 2.73 | 6.72 | 133 | 91.2 |
| Positive electrode material S12 | $Na_{0.85}Li_{0.1}(Co_{0.25}Mn_{0.75})_{0.7}Fe_{0.2}O_2$ | 28.5 | 1.2 | 2.72 | 4.66 | 132.3 | 92.6 |
| Positive electrode material S13 | $Na_{0.85}Li_{0.1}(Zn_{0.25}Mn_{0.75})_{0.7}Fe_{0.2}O_2$ | 28.5 | 1.2 | 2.74 | 4.34 | 100.8 | 93.8 |
| Positive electrode material S14 | $Na_{0.85}Li_{0.1}(Mg_{0.25}Mn_{0.75})_{0.7}Fe_{0.2}O_2$ | 28.5 | 1.2 | 2.73 | 4.29 | 101.6 | 94.3 |
| Positive electrode material S15 | $Na_{0.85}Li_{0.1}(Al_{0.25}Mn_{0.75})_{0.7}Fe_{0.2}O_2$ | 28.5 | 1.2 | 2.72 | 5.11 | 109.2 | 91.8 |
| Positive electrode material D1 | $Na_{0.9}Ni_{0.3}Mn_{0.4}Fe_{0.3}O_2$ | 28.5 | 1.14 | 4.57 | 20 | 140 | 70.3 |
| Positive electrode material D2 | $Na_{0.9}Ni_{0.3}Mn_{0.4}Fe_{0.3}O_2$ | 3 | 9.8 | 1 | 0.67 | 145.3 | 49.6 |
| Positive electrode material D3 | $Na_{0.9}Ni_{0.3}Mn_{0.4}Fe_{0.3}O_2$ | 50 | 0.1 | 16.8 | 55.43 | 134.7 | 56.4 |

TABLE 2

| Serial number | Positive active material | Coating weight A of single-sided positive active material layer (g/m²) | Negative active material | Coating weight B of single-sided negative active material layer (g/m²) | First-cycle battery DCR (Ω) | 1 C. 100th-cycle capacity retention rate (%) |
|---|---|---|---|---|---|---|
| Embodiment 1 | S1 | 108.7 | Hard carbon | 44.8 | 5.3 | 94.7 |
| Embodiment 2 | S2 | 108.7 | Hard carbon | 44.8 | 4.5 | 99.8 |
| Embodiment 3 | S3 | 108.7 | Hard carbon | 44.8 | 5.9 | 93.5 |
| Embodiment 4 | S4 | 108.7 | Hard carbon | 44.8 | 6.5 | 91.2 |
| Embodiment 5 | S5 | 108.7 | Hard carbon | 44.8 | 7.2 | 87.8 |
| Embodiment 6 | S6 | 108.7 | Hard carbon | 44.8 | 8.2 | 83.4 |
| Embodiment 7 | S7 | 108.7 | Hard carbon | 44.8 | 6.8 | 88.6 |
| Embodiment 8 | S8 | 108.7 | Hard carbon | 44.8 | 5.7 | 94.3 |
| Embodiment 9 | S9 | 108.7 | Hard carbon | 44.8 | 4.8 | 98.7 |
| Embodiment 10 | S10 | 108.7 | Hard carbon | 44.8 | 8.0 | 85.6 |
| Embodiment 11 | S11 | 108.7 | Hard carbon | 44.8 | 4.7 | 98.9 |
| Embodiment 12 | S12 | 108.7 | Hard carbon | 44.8 | 4.6 | 99.3 |
| Embodiment 13 | S13 | 108.7 | Hard carbon | 44.8 | 4.8 | 97.9 |
| Embodiment 14 | S14 | 108.7 | Hard carbon | 44.8 | 4.7 | 98.8 |
| Embodiment 15 | S15 | 108.7 | Hard carbon | 44.8 | 4.6 | 99.5 |
| Embodiment 16 | S2 | 115.3 | Hard carbon | 44.8 | 13.4 | 52.3 |
| Embodiment 17 | S2 | 110.8 | Hard carbon | 44.8 | 5.2 | 93.7 |
| Embodiment 18 | S2 | 98.6 | Hard carbon | 44.8 | 4.8 | 99.3 |
| Embodiment 19 | S2 | 80.7 | Hard carbon | 44.8 | 5.6 | 99.5 |
| Embodiment 20 | S2 | 72.5 | Soft carbon | 44.8 | 7.7 | 85.6 |
| Embodiment 21 | S2 | 18.1 | Graphite | 44.8 | 9 | 70.9 |
| Comparative Embodiment 1 | D1 | 103.7 | Hard carbon | 44.8 | 9.6 | 75.6 |

TABLE 2-continued

| Serial number | Positive active material | Coating weight A of single-sided positive active material layer (g/m²) | Negative active material | Coating weight B of single-sided negative active material layer (g/m²) | First-cycle battery DCR (Ω) | 1 C. 100th-cycle capacity retention rate (%) |
|---|---|---|---|---|---|---|
| Comparative Embodiment 2 | D2 | 99.9 | Hard carbon | 44.8 | 11.3 | 65.8 |
| Comparative Embodiment 3 | D3 | 107.8 | Hard carbon | 44.8 | 12.5 | 59.4 |
| Comparative Embodiment 4 | D1 | 69.1 | Soft carbon | 44.8 | 11.6 | 64.3 |
| Comparative Embodiment 5 | D1 | 17.3 | Graphite | 44.8 | 15.2 | 42.8 |

Referring to the data in Table 1, as can be learned from the change of the $R_{ct}/R_f$ ratio value of the positive active materials S1~S5 doped with different amounts of $Li^+$, with the increase of the $Li^+$ doping amount, both the first-cycle $R_{ct}/R_f$ ratio value and the $100^{th}$-cycle $R_{ct}/R_f$ ratio value take on a tendency to decrease and then increase. However, the capacity retention rate of the materials after 100 cycles at a current of 1 C takes on a tendency to increase and then decrease. This indicates that the enhancement of the cycle performance of the materials is greater when the first-cycle $R_{ct}/R_f$ ratio value of the positive active material is controlled to be within a more suitable range ($2<R_{ct}/R_f$ ratio$<3$). That is because the amount of metal ions is not enough for forming a stable CEI film when the $Li^+$ doping amount is lower than a preferred value of 0.1. Therefore, a small part of transition metal ions dissolve out to participate in the film formation and are consumed, then the structure of the material is destroyed, thereby hindering the shuttling of electrons and the intercalation and deintercalation of ions during charge and discharge. Consequently, the first-cycle $R_{ct}/R_f$ ratio value of increases, the kinetics performance decreases, and both the specific discharge capacity and the cycle performance of the material are inferior to those of the material doped with a more appropriate amount of $Li^+$. However, when the $Li^+$ doping amount is more than an optimal value, the positive active material is a non-pure phase, and excess $Li^+$ ions exist as an impurity phase. Such impurity phase hinders the shuttling of electrons in the material. Consequently, the first-circle $R_{ct}/R_f$ ratio value increases, the kinetics performance decreases, and both the specific discharge capacity and the cycle performance of the positive active material are inferior to those of the material doped with the optimal amount of $Li^+$. The experimental data shows that the positive active material S2 exhibits higher performance. Therefore, when the $Li^+$ doping amount is approximately 0.1, the $Na_{0.85}Li_{0.1}(Ni_{0.25}Mn_{0.75})_{0.7}Fe_{0.2}O_2$ material has a higher specific discharge capacity and excellent cycle performance.

As can be learned from the performance comparison between the positive active material S2 and the positive active materials S6~S10 of different particle sizes, the particle size of the material is correlated with the change of the $R_{ct}/R_f$ ratio value and the cycle performance of the material. Specifically, for the $Na_{0.85}Li_{0.1}(Ni_{0.25}Mn_{0.75})_{0.7}Fe_{0.2}O_2$ material with a small particle size, a transmission path of electrons inside the particles of the positive active material is relatively short, and therefore, the electrons can diffuse to the surface of the material more quickly to contact a more conductive medium. As a result, the $R_{ct}/R_f$ ratio value is relatively small, and the capacity of the material can be exerted to a greater extent. However, due a relatively large specific surface area and a larger area of contacting the electrolytic solution, the small-sized particles provide more active sites for occurrence of side effects of the electrolytic solution and the positive active material. Consequently, the diffusion resistance of ions increases significantly with the increase of the cycles, and the cycle performance of the material is relatively poor. This is verified by the comparison data of the positive active material S2, the positive active materials S6~S7, and the positive active material D2.

When the particle size of the positive active material is relatively large, the transmission path of the electrons inside crystal grains of the material is relatively long, resulting in a high resistivity $R_{ct}$ of the material and hindering exertion of the capacity of the material. This is verified by the comparison data of the positive active materials S2, S10, and D3.

As can be seen from the data in Table 2, after a full battery is formed from hard carbon and the positive active materials S1~S5 doped with different amounts of lithium, the cycle performance of the full battery also varies even if the same preferred A/B ratio range is applied. See Embodiments 1~5 in Table 2. That is mainly caused by inherent characteristics of the positive active material. Specifically, the amount of metal ions is not enough for forming a stable CEI film when the $Li^+$ doping amount is lower than the preferred value of 0.1. Therefore, a small part of transition metal ions dissolve out to participate in the film formation and are consumed, thereby increasing the DCR of the battery. However, when the Li+ doping amount is more than the optimal value, the positive active material is a non-pure phase, and excess Li+ ions exist as an impurity phase. Such impurity phase consumes the electrolytic solution and participates in the film formation, thereby increasing the DCR of the battery, and deteriorating the cycle performance of the material. To be specific, when the $Li^+$ doping amount is the optimal value of 0.1, the DCR of the battery changes the least with the increase of cycles, and the cycle performance of the battery is the most excellent and better than the cycle performance of Comparative Embodiment D1. This also shows that the doping lithium in this system helps to improve the cycle performance of the material.

Referring to Embodiments 6~10 and Comparative Embodiments 1~3 in Table 2, the particle size of the positive active material also has an effect on the cycle performance of the sodium-ion battery, and the reasons for the effect are similar to those listed in Table 1.

When the positive electrode material S2 doped with the optimal doping amount combines with hard carbon to form a full battery, the difference in the areal density ratio A/B also has a significant effect on the cycle performance of the battery. Referring to Embodiments 2 and 16~19 in Table 2, specifically, when the A/B ratio approaches 2.57, the sodium ions deintercalated from the positive electrode are unable to sufficiently intercalated into the negative electrode, and sodium is likely to be plated on the negative electrode, thereby attenuating the cycle capacity of the battery quickly. When the A/B ratio approaches 1.8, more surface functional groups of the negative electrode participate in the film formation, and the DCR increases, thereby decreasing the energy density of the battery. That is, when the ratio of the areal density A of the positive active material layer to the areal density B of the negative active material layer is within a preferred range, the A/B ratio helps to ensure that the capacity of the sodium-ion battery is well exerted and that the first-cycle coulombic efficiency is relatively high, and also ensures that the sodium ions deintercalated from the positive electrode are sufficiently intercalated into the negative electrode to prevent the sodium plating on the negative electrode.

When the positive electrode material combines with negative electrodes of different carbon materials to form a full battery, as can be seen from the performance data of Embodiments 2 and 11~20 and Comparative Embodiments 1 and 4~5 in Table 2, the negative electrode is optionally made of a hard carbon material, and the positive active material is optionally made of S2.

In conclusion, to achieve a better balance between the capacity and the cycle performance of the material, it is necessary to take into account the $Li^+$ doping amount in the positive active material, the particle size of the material, the $R_{ct}/R_f$ ratio value of the material, the selection of the negative electrode of the full battery, and the areal density ratio A/B, and to control all such parameters to fall within the scope specified in this application.

Figure 9:
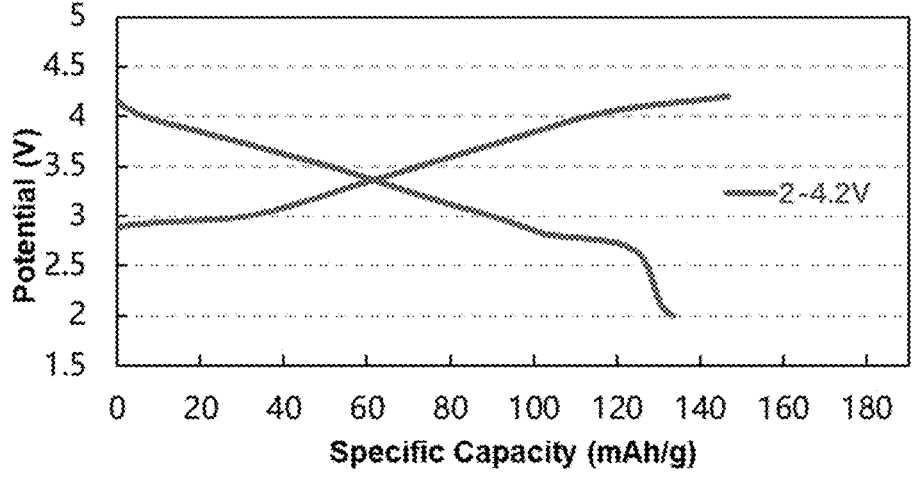
FIG. 9 is a first-cycle charge and discharge curve of a button battery made of a positive active material S2 as tested within a voltage range of 2~4.2 V.

FIG. 9 is a first-cycle charge and discharge curve of a button battery made of a positive active material S2 in Table 1 as tested within a voltage range of 2~4.2 V. As can be seen from the drawing, the sodium-ion button battery has a relatively high mass specific capacity.

Figure 10:
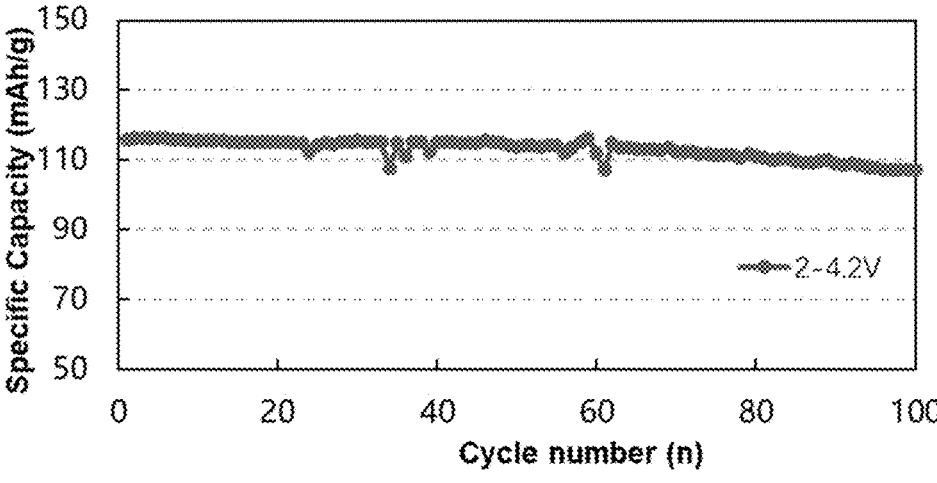
FIG. 10 is a cycle charge and discharge curve of a button battery made of a positive active material S2 as tested within a voltage range of 2~4.2 V.

FIG. 10 is a cycle charge and discharge curve of a button battery made of a positive active material S2 in Table 1 as tested within a voltage range of 2~4.2 V. As can be seen from the drawing, the sodium-ion battery still maintains a relatively high mass specific capacity after the sodium-ion battery is charged and discharged for 100 cycles.

The foregoing descriptions are merely optional embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

What is claimed is:

1. A sodium-ion battery, comprising a positive electrode plate, a negative electrode plate, a separator, and an electrolytic solution, wherein the positive electrode plate comprises a positive active material, a molecular formula of the positive active material satisfies $Na_aLi_bM_{0.7}Fe_{0.3-b}O_{2\pm\delta}$, M is a combination of Mn and one of Cu, Zn, and Mg, 0.67<a<1.1, 0.05<b<0.2, 0<δ<0.1, and in a charge and discharge curve of a button battery made of the positive active material, a ratio of $R_{ct}$ to $R_f$ of the positive active material satisfies 2<$R_{ct}/R_f$<3 for the first cycle and 4.29≤$R_{ct}/R_f$≤6.72 for the 100th cycle;

$R_{ct}$ is a charge transfer resistance of the positive active material measured in the button battery based on alternating current impedance spectroscopy; and $R_f$ is a diffusion resistance of the positive active material measured in the button battery based on the alternating current impedance spectroscopy, a median diameter $D_v50$ of the positive active material (μm), a specific surface area S (m²/g) of the positive active material, and the $R_{ct}/R_f$ satisfy:

$$47.5 < \frac{R_{ct}/R_f * D_v50}{S} < 160.$$

2. The sodium-ion battery according to claim 1, wherein a resistance of the positive electrode plate is R≤1,000 mΩ.

3. The sodium-ion battery according to claim 1, wherein a resistance of the positive electrode plate is R≤100 mΩ.

4. The sodium-ion battery according to claim 1, wherein a tapped density of the positive active material is greater than 1 g/cm³.

5. The sodium-ion battery according to claim 1, wherein a tapped density of the positive active material is within a range of 1.5~3 g/cm³.

6. The sodium-ion battery according to claim 1, wherein a compacted density of the positive active material under 8 tons is within a range of 1.5~4.5 g/cm³.

7. The sodium-ion battery according to claim 1, wherein a median diameter $D_v50$ of the positive active material is within a range of 0.05~50 μm.

8. The sodium-ion battery according to claim 1, wherein a median diameter $D_v50$ of the positive active material is within a range of 3~30 μm.

9. The sodium-ion battery according to claim 1, wherein a specific surface area S of the positive active material is within a range of 0.01~30 m²/g.

10. The sodium-ion battery according to claim 1, wherein a specific surface area S of the positive active material is within a range of 0.1~10 m²/g.

11. The sodium-ion battery according to claim 1, wherein the negative active material in the negative electrode plate is a carbon material.

12. The sodium-ion battery according to claim 1, wherein the negative active material in the negative electrode plate is a hard carbon material.

13. The sodium-ion battery according to claim 1, wherein an areal density A (g/m²) of a single-sided positive active material layer of the positive electrode plate and an areal density B (g/m²) of a single-sided negative active material layer of the negative electrode plate satisfy: 1.8<A/B<2.57.

14. A device that uses a sodium-ion battery as a power supply, wherein the device comprises the sodium-ion battery according to claim 1.

15. A positive active material for a sodium-ion battery, wherein a molecular formula of the positive active material satisfies $Na_aLi_bM_{0.7}Fe_{0.3-b}O_{2\pm\delta}$, M is a combination of Mn and one of Cu, Zn, and Mg, 0.67<a<1.1, 0.05<b<0.2, and 0≤δ≤0.1, and in a charge and discharge curve of a button battery made of the positive active material, a ratio of $R_{ct}$ to $R_f$ of the positive active material satisfies 2<$R_{ct}/R_f$<3 for the first cycle and 4.29≤$R_{ct}/R_f$≤6.72 for the 100th cycle,

wherein, $R_{ct}$ is a charge transfer resistance of the positive active material measured in the button battery based on alternating current impedance spectroscopy; and $R_f$ is a diffusion resistance of the positive active material measured in the button battery based on the alternating current impedance spectroscopy, a median diameter $D_v50$ of the positive active material (μm), a specific surface area S (m²/g) of the positive active material, and the $R_{ct}/R_f$ satisfy:

$$47.5 < \frac{R_{ct}/R_f * D_v50}{S} < 160.$$

\* \* \* \* \*